United States Patent
Harrison et al.

(10) Patent No.: US 7,305,093 B2
(45) Date of Patent: Dec. 4, 2007

(54) METHOD AND APPARATUS FOR SECURELY TRANSFERRING DATA

(75) Inventors: Keith Alexander Harrison, Woodcroft Chepstow (GB); Liqun Chen, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 846 days.

(21) Appl. No.: 10/623,008

(22) Filed: Jul. 17, 2003

(65) Prior Publication Data

US 2004/0019779 A1    Jan. 29, 2004

(30) Foreign Application Priority Data

Jul. 18, 2002    (GB) .................................. 0216690.8

(51) Int. Cl.
*H04L 9/00* (2006.01)
(52) U.S. Cl. ..................................................... 380/282
(58) Field of Classification Search ................ 380/282, 380/277, 278; 705/76, 77, 78; 713/150, 713/153, 155
See application file for complete search history.

(56) References Cited

U.S. PATENT DOCUMENTS

| | | | | |
|---|---|---|---|---|
| 4,688,250 | A | 8/1987 | Corrington et al. | ............ 280/23 |
| 7,142,676 | B1* | 11/2006 | Hillier et al. | ................ 380/278 |
| 2001/0039535 | A1* | 11/2001 | Tsiounis et al. | .............. 705/71 |
| 2002/0174075 | A1* | 11/2002 | Mirlas et al. | .................. 705/78 |
| 2003/0084001 | A1* | 5/2003 | Chang | .......................... 705/64 |
| 2004/0010700 | A1* | 1/2004 | Mont | .......................... 713/189 |
| 2004/0240666 | A1* | 12/2004 | Cocks | .......................... 380/44 |

FOREIGN PATENT DOCUMENTS

| | | |
|---|---|---|
| EP | 0 343 805 A2 | 11/1989 |
| EP | 0 673 154 A1 | 9/1995 |
| EP | 1 050 992 A1 | 11/2000 |

OTHER PUBLICATIONS

Levy, I., "An Overview of Identifier-Based Public Key Cryptography," *Internet and Wireless Security*, IEE Publishing, pp. 121-131 (Apr. 22, 2002).
Levy, I., "Identifier Based PKC-Potential Applications," *1st Annual PKI Research Workshop, Communications-Electronics Security Group (CESG) Presentation*, Gaithersburg, Maryland, pp. 1-42 (Apr. 25, 2002).

(Continued)

*Primary Examiner*—Matthew B Smithers
(74) *Attorney, Agent, or Firm*—Ladas & Parry LLP

(57) ABSTRACT

A method and apparatus is provided for securely transferring first and second data from a user to first and second parties respectively. More particularly, the user encrypts the first data using a first encryption key associated with the first party, and then encrypts the second data using, as encryption parameters, both public data of the first party and third data comprising the encrypted first data. The third data is then provided, preferably via the second party, to the first party, and the encrypted second data is provided to the second party. The first party uses a first decryption key to decrypt the encrypted first data, as provided to the first party in the third data, whereby to recover the first data. The first party also uses the third data, along with private data related to the aforesaid public data, to generate a second decryption key which is then provided to the second party to enable it to decrypt the encrypted second data.

22 Claims, 4 Drawing Sheets

OTHER PUBLICATIONS

Menezes, A., et al., *Handbook of Applied Cryptography*, CRC Press Series on Discrete Mathematics and its Applications, Boca Raton, Florida, pp. 497-498, 507-508 (1997).

Boneh, Dan, et al., "Identity-Based Encryption from the Weil Pairing," *Advances in Cryptology, CRYPTO 2001*, 2001, pp. 213-229.

Boneh, Dan, et al., "Identity-Based Mediated RSA," *3rd Workshop on Information Security Application*, Aug. 2002.

Cocks, Clifford, "An Identity Based Encryption Scheme Based on Quadratic Residues," *Proceedings of the 8th IMA International Conference on Cryptography and Coding*, 2001, pp. 360-363.

* cited by examiner

METHOD AND APPARATUS FOR SECURELY TRANSFERRING DATA

FIELD OF THE INVENTION

The present invention relates to a method and system for securely transferring data.

BACKGROUND OF THE INVENTION

With the wide spread use of the Internet commercial transactions over the Internet have become commonplace. However, unlike commercial transactions that are conducted face-to-face, transactions over the Internet typically involve the exchange of private and confidential information, for example providing access to a party's bank account details, credit card details and home address.

Accordingly, many individuals still have concerns over confidentiality; as a result the full potential of the Internet is still not being utilized.

It is desirable to improve this situation.

Embodiments of the present invention to be described hereinafter make use of a cryptographic technology known as identifier-based encryption. Accordingly, a brief description will now be given of this type of encryption.

Identifier-Based Encryption (IBE) is an emerging cryptographic schema. In this schema (see FIG. 1 of the accompanying drawings), a data provider 10 encrypts payload data 13 using both an encryption key string 14, and public data 15 provided by a trusted authority 12. This public data 15 is derived by the trusted authority 12 using private data 17 and a one-way function 18. The data provider 10 then provides the encrypted payload data <13> to a recipient 11 who decrypts it, or has it decrypted, using a decryption key computed by the trusted authority 12 based on the encryption key string and its own private data.

A feature of identifier-based encryption is that because the decryption key is generated from the encryption key string, its generation can be postponed until needed for decryption.

Another feature of identifier-based encryption is that the encryption key string is cryptographically unconstrained and can be any kind of string, that is, any ordered series of bits whether derived from a character string, a serialized image bit map, a digitized sound signal, or any other data source. The string may be made up of more than one component and may be formed by data already subject to upstream processing. In order to avoid cryptographic attacks based on judicious selection of a key string to reveal information about the encryption process, as part of the encryption process the encryption key string is passed through a one-way function (typically some sort of hash function) thereby making it impossible to choose a cryptographically-prejudicial encryption key string. In applications where defence against such attacks is not important, it would be possible to omit this processing of the string.

Frequently, the encryption key string serves to "identify" the intended message recipient and this has given rise to the use of the label "identifier-based" or "identity-based" generally for cryptographic methods of the type under discussion. However, depending on the application to which such a cryptographic method is put, the string may serve a different purpose to that of identifying the intended recipient and, indeed, may be an arbitrary string having no other purpose than to form the basis of the cryptographic processes. Accordingly, the use of the term "identifier-based" or "IBE" herein in relation to cryptographic methods and systems is to be understood simply as implying that the methods and systems are based on the use of a cryptographically unconstrained string whether or not the string serves to identify the intended recipient. Generally, in the present specification, the term "encryption key string" or "EKS" is used rather than "identity string" or "identifier string".

A number of IBE algorithms are known and FIG. 2 indicates, for three such algorithms, the following features, namely:
- the form of the encryption parameters used, that is, the encryption key string and the public data of the trusted authority (TA);
- the conversion process applied to the encryption key string to prevent attacks based on judicious selection of this string;
- the primary encryption computation effected;
- the form of the encrypted output.

The three prior art IBE algorithms to which FIG. 2 relates are:

Quadratic Residuosity (QR) method as described in the paper: C. Cocks, "An identity based encryption scheme based on quadratic residues", Proceedings of the $8^{th}$ IMA International Conference on Cryptography and Coding, LNCS 2260, pp 360-363, Springer-Verlag, 2001. A brief description of this form of IBE is given hereinafter.

Bilinear Mappings p using, for example, a Tate pairing t or Weil pairing ê. Thus, for the Weil pairing:

$$ê: G_1 \times G_1 \rightarrow G_2$$

where $G_1$ and $G_2$ denote two algebraic groups of prime order q and $G_2$ is a subgroup of a multiplicative group of a finite field. The Tate pairing can be similarly expressed though it is possible for it to be of asymmetric form:

$$t: G_1 \times G_0 \rightarrow G_2$$

where $G_0$ is a further algebraic group the elements of which are not restricted to being of order q. Generally, the elements of the groups $G_0$ and $G_1$ are points on an elliptic curve though this is not necessarily the case. A description of this form of IBE method, using Weil pairings is given in the paper: D. Boneh, M. Franklin—"Identity-based Encryption from the Weil Pairing" in *Advances in Cryptology—CRYPTO* 2001, LNCS 2139, pp. 213-229, Springer-Verlag, 2001.

RSA-Based methods The RSA public key cryptographic method is well known and in its basic form is a two-party method in which a first party generates a public/private key pair and a second party uses the first party's public key to encrypt messages for sending to the first party, the latter then using its private key to decrypt the messages. A variant of the basic RSA method, known as "mediated RSA", requires the involvement of a security mediator in order for a message recipient to be able to decrypt an encrypted message. An IBE method based on mediated RSA is described in the paper "Identity based encryption using mediated RSA", D. Boneh, X. Ding and G. Tsudik, 3rd Workshop on Information Security Application, Jeju Island, Korea, August 2002.

A more detailed description of the QR method is given below with reference to the entities depicted in FIG. 1 and using the same notation as given for this method in FIG. 2. In the QR method, the trusted authority's public data 15 comprises a value N that is a product of two random prime numbers p and q, where the values of p and q are the private data 17 of the trusted authority 12. The values of p and q should ideally be in the range of $2^{511}$ and $2^{512}$ and should both satisfy the equation: $p,q \equiv 3 \mod 4$. However, p and q must not have the same value. Also provided is a hash function # which when applied to a string returns a value in the range 0 to N−1.

Each bit of the user's payload data 13 is then encrypted as follows:

The data provider 10 generates random numbers $t_+$ (where $t_+$ is an integer in the range $[0, 2^N]$) until a value of $t_+$ is found that satisfies the equation $jacobi(t_+, N) = m'$, where m' has a value of −1 or 1 depending on whether the corresponding bit of the user's data is 0 or 1 respectively. (As is well known, the jacobi function is such that where $x^2 \equiv \#mod N$ the jacobi ($\#$, N)=−1 if x does not exist, and =1 if x does exist). The data provider 10 then computes the value:

$$s_+ \equiv (t_+ + K/t_+) \bmod N$$

where: $s_+$ corresponds to the encrypted value of the bit m' concerned, and $$K = \#(\text{encryption key string})$$

Since K may be non-square, the data provider additionally generates additional random numbers $t_-$ (integers in the range $[0, 2^N)$) until one is found that satisfies the equation $jacobi(t_-, N) = m'$. The data provider 10 then computes the value:

$$s_- \equiv (t_- - K/t) \bmod N$$

as the encrypted value of the bit m concerned.

The encrypted values $s_+$ and $s_-$ for each bit m' of the user's data are then made available to the intended recipient 11, for example via e-mail or by being placed in a electronic public area; the identity of the trusted authority 12 and the encryption key string 14 will generally also be made available in the same way.

The encryption key string 14 is passed to the trusted authority 12 by any suitable means; for example, the recipient 11 may pass it to the trusted authority or some other route is used—indeed, the trusted authority may have initially provided the encryption key string. The trusted authority 12 determines the associated private key B by solving the equation:

$$B^2 \equiv K \bmod N \text{ ("positive" solution)}$$

If a value of B does not exist, then there is a value of B that is satisfied by the equation:

$$B^2 \equiv K \bmod N \text{ ("negative" solution)}$$

As N is a product of two prime numbers p, q it would be extremely difficult for any one to calculate the decryption key B with only knowledge of the encryption key string and N. However, as the trusted authority 12 has knowledge of p and q (i.e. two prime numbers) it is relatively straightforward for the trusted authority 12 to calculate B.

Any change to the encryption key string 14 will result in a decryption key 16 that will not decrypt the payload data 13 correctly. Therefore, the intended recipient 11 cannot alter the encryption key string before supplying it to the trusted authority 12.

The trusted authority 12 sends the decryption key to the data recipient 11 along with an indication of whether this is the "positive" or "negative" solution for B.

If the "positive" solution for the decryption key has been provided, the recipient 11 can now recover each bit m' of the payload data 13 using:

$$m' = jacobi(s_+ + 2B, N)$$

If the "negative" solution for the decryption key B has been provided, the recipient 11 recovers each bit m' using:

$$m' = jacobi(s_- + 2B, N)$$

SUMMARY OF THE INVENTION

In accordance with a first aspect of the present invention there is provided a method of securely transferring first and second data from a user to first and second parties respectively, wherein:

the user encrypts the first data using a first encryption key associated with the first party, and then encrypts the second data using, as encryption parameters, both public data of said first party and third data comprising the encrypted first data;

the third data is provided to the first party and the encrypted second data is provided to the second party;

the first party uses a first decryption key to decrypt the encrypted first data, as provided to the first party in said third data, whereby to recover the first data; the first party also using the third data, along with private data related to said public data, to generate a second decryption key;

the second decryption key is provided to the second party which uses it to decrypt the encrypted second data.

Typically, the first data comprises a message with interpretable content. For example, the message may comprises an instruction to the first party to carry out a specific action, the first party interpreting the recovered first data and carrying out said specific action. The message may alternatively or additionally comprise a condition to be satisfied before the second decryption key is provided to the second party, the first party interpreting the recovered first data and ensuring that said condition is satisfied before it generates said second decryption key and/or provides that key to the second party.

Conveniently, the user sends the encrypted second data, together with the third data, to the second party; the second party then being responsible for providing the third data to the first party.

In accordance with a second aspect of the present invention there is provided a computer system comprising first, second and third computing entities, wherein:

the first computing entity comprises a first arrangement for encrypting a first data set using a first encryption key associated with a third party; a second arrangement for encrypting a second data set using, as encryption parameters, both public data of said third party and a third data set comprising the encrypted first data set; and a third arrangement for outputting the encrypted second data set for provision to the second computing entity and for outputting the third data set for provision to the third computing entity; and the third computing entity is associated with said third party and is arranged to use a first decryption key to decrypt the encrypted first data as provided to the third computing entity in said third data set whereby to recover the first data set; the third computing entity being further arranged to generate, using the third data set and private data related to said public data, a second decryption key for enabling the second computing entity to decrypt the encrypted second data set.

In accordance with a third aspect of the present invention there is provided apparatus comprising:

first means for forming a first data set comprising a message intended for a trusted authority;

second means for encrypting the first data set using an encryption key associated with the trusted authority;

third means for encrypting a second data set using, as encryption parameters, both public data of the trusted authority and a third data set comprising the encrypted first data set;

fourth means for outputting the encrypted second data set for provision to another party and for outputting the third data set for provision to the trusted authority.

The present invention also encompasses a computer program product for use in implementing the foregoing apparatus.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 3:
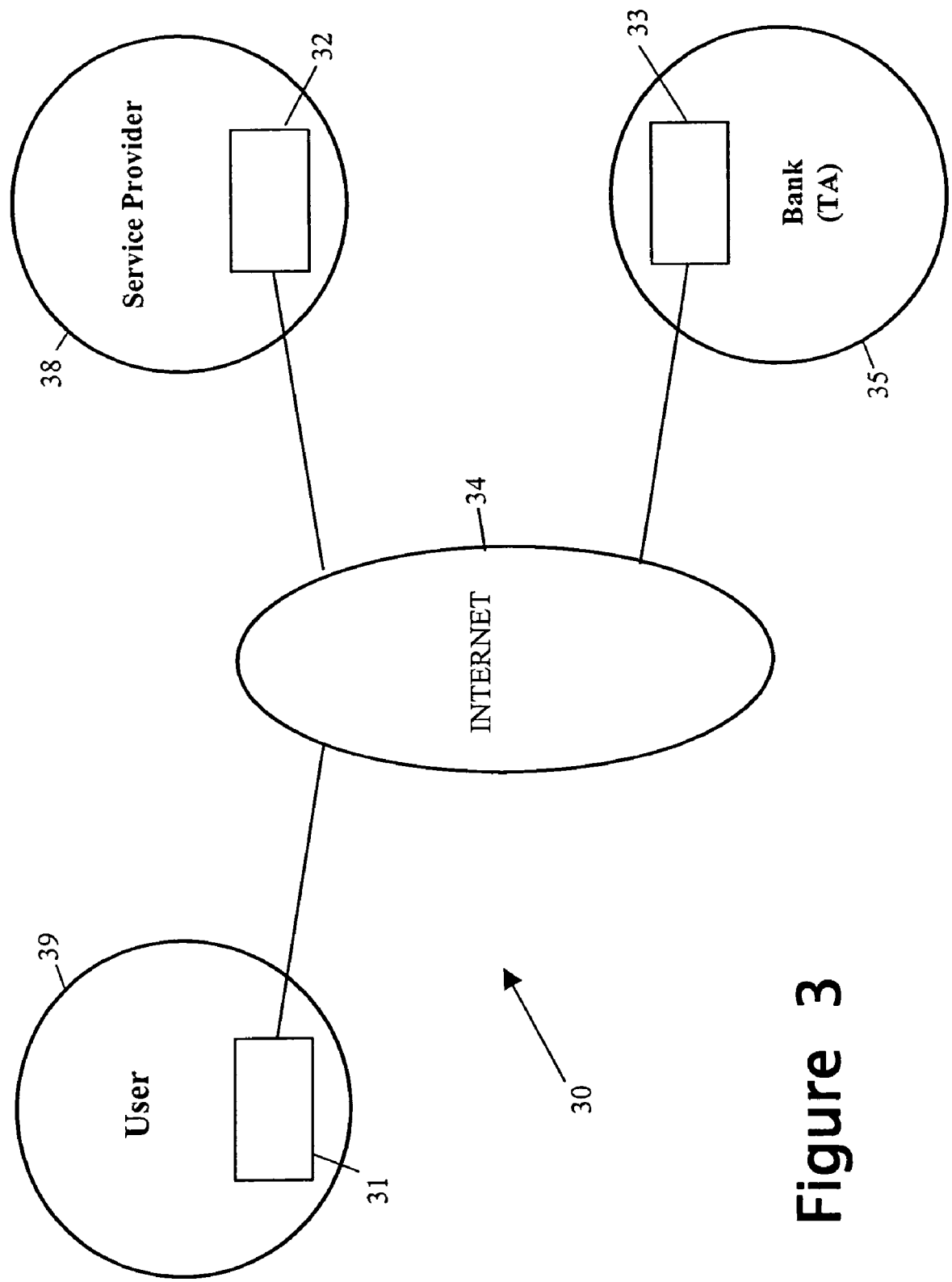
FIG. 3 is a diagram of an embodiment of the present invention.

The FIG. 3 embodiment of the invention concerns a computer system that allows a user to place an electronic order with a service provider where the service provider has restricted access to the user's private and confidential information necessary to complete the order.

In particular, confidential information that is included in the order because it is required by the service provider to complete the transaction, for example the user's address, is encrypted with an IBE encryption key string; furthermore, this encryption key string is in itself an encrypted message from the user to the user's bank. The bank, acting as a trusted authority, is the only entity that is able to derive the IBE decryption key needed by the service provider to access the encrypted information included in the order. Accordingly, for the service provider to complete the transaction the service provider must provide the IBE encryption key string to the bank to allow the bank to derive the associated IBE decryption key. On receipt of the IBE encryption key string the bank decrypts it to access the message from the user (this message can, for example, include instructions to pay the service provider), while also providing the associated IBE decryption key to the service provider to allow the latter to decrypt the encrypted confidential information provided by the user to the service provider as part of the order.

More particularly, in FIG. 3 there is shown a computer system 30 comprising a first computing entity 31, a second computing entity 32 and a third computing entity 33.

Typically the three computing entities 31, 32, 33 are configured on separate computer platforms, however the computing entities 31, 32, 33 could be configured on a single computer platform. However the computing entities are configured, they are provide with suitable communication means for enabling them to inter-communicate; in the present example, the three computing entities 31, 32, 33 inter-communicate via the Internet 34. The communication between the various parties can make use of standard protocols such as HTTP and SOAP. Further, where required, secure connections can be established using secure protocols such as SSL.

Associated with the second computing entity 32 is a service provider 38 that offers goods and/or services on a website run by entity 32 and accessible via the network 34; 30 as will be appreciated by a person skilled in the art, the service provider 38 could offer goods and/or services in a variety of ways, for example via email.

The first computing entity 31 is configured to allow a user 39 to access the service provider 38, via the second computing entity 32, to allow the user 39 to place an order with the service provider 38 for goods and/or service, as described below.

Figure 4:
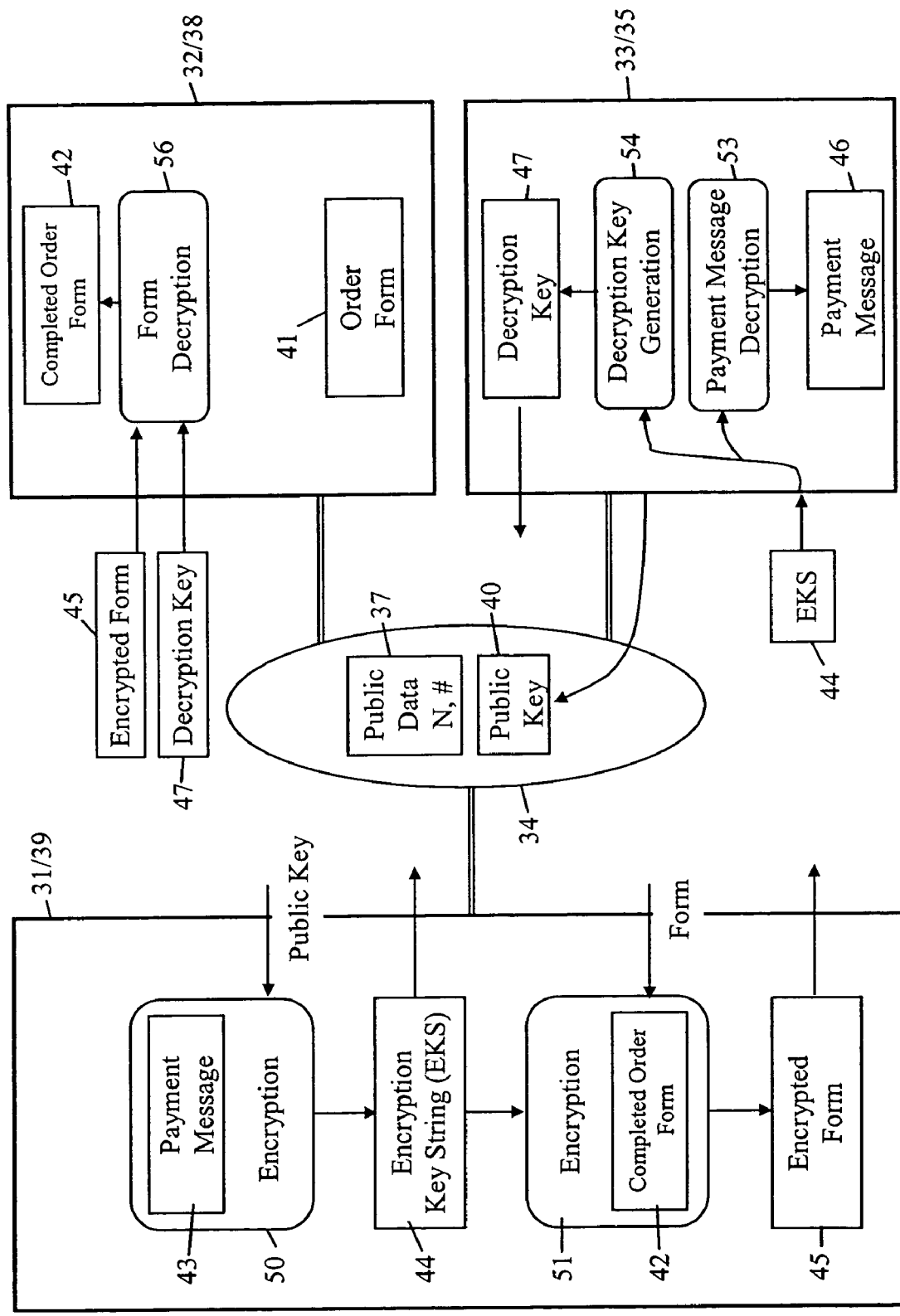
FIG. 4 is a diagram illustrating the flow of encryption and decryption operations performed by the FIG. 3 embodiment.

Associated with the third computing entity 33 is a bank 35 with which the user 39 has a bank and credit card account. The bank 35 is configured to act as a trusted authority. As depicted in FIG. 4, the bank 35 makes publicly available certain information comprising:

the public data 17 of an IBE method for which the bank performs the role of trusted authority—the corresponding private data is held by the bank 35;

the public key 40 of a public/private key pair—the corresponding private key is held by the bank 35.

As will be appreciated by persons skilled in the art the trusted authority's public data 37 can be made available in a variety of ways, for example via a public web site (not shown).

Figure 1:
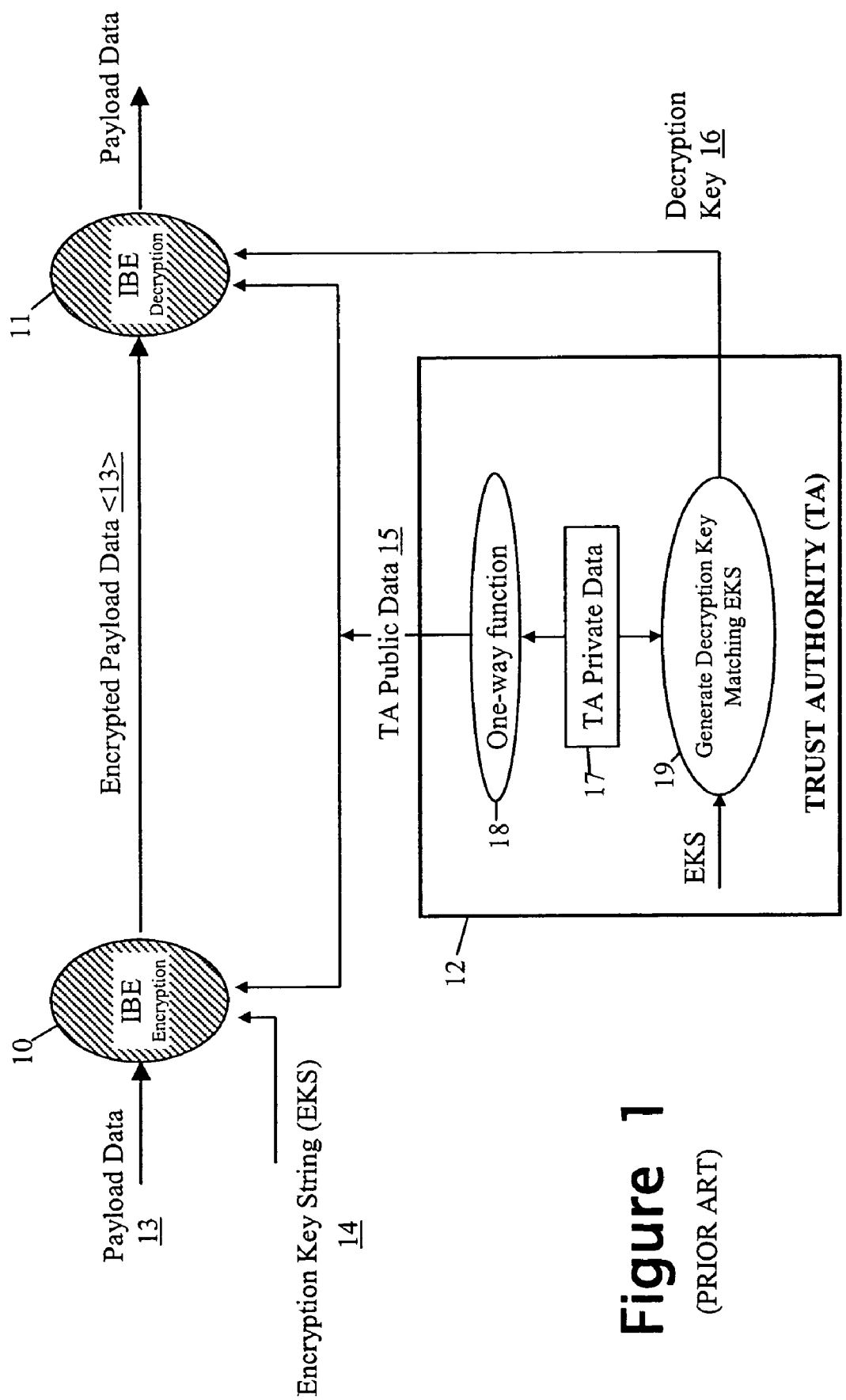
FIG. 1 is a diagram illustrating the operation of a prior art encryption schema known as Identifier-Based Encryption.
Figure 2:
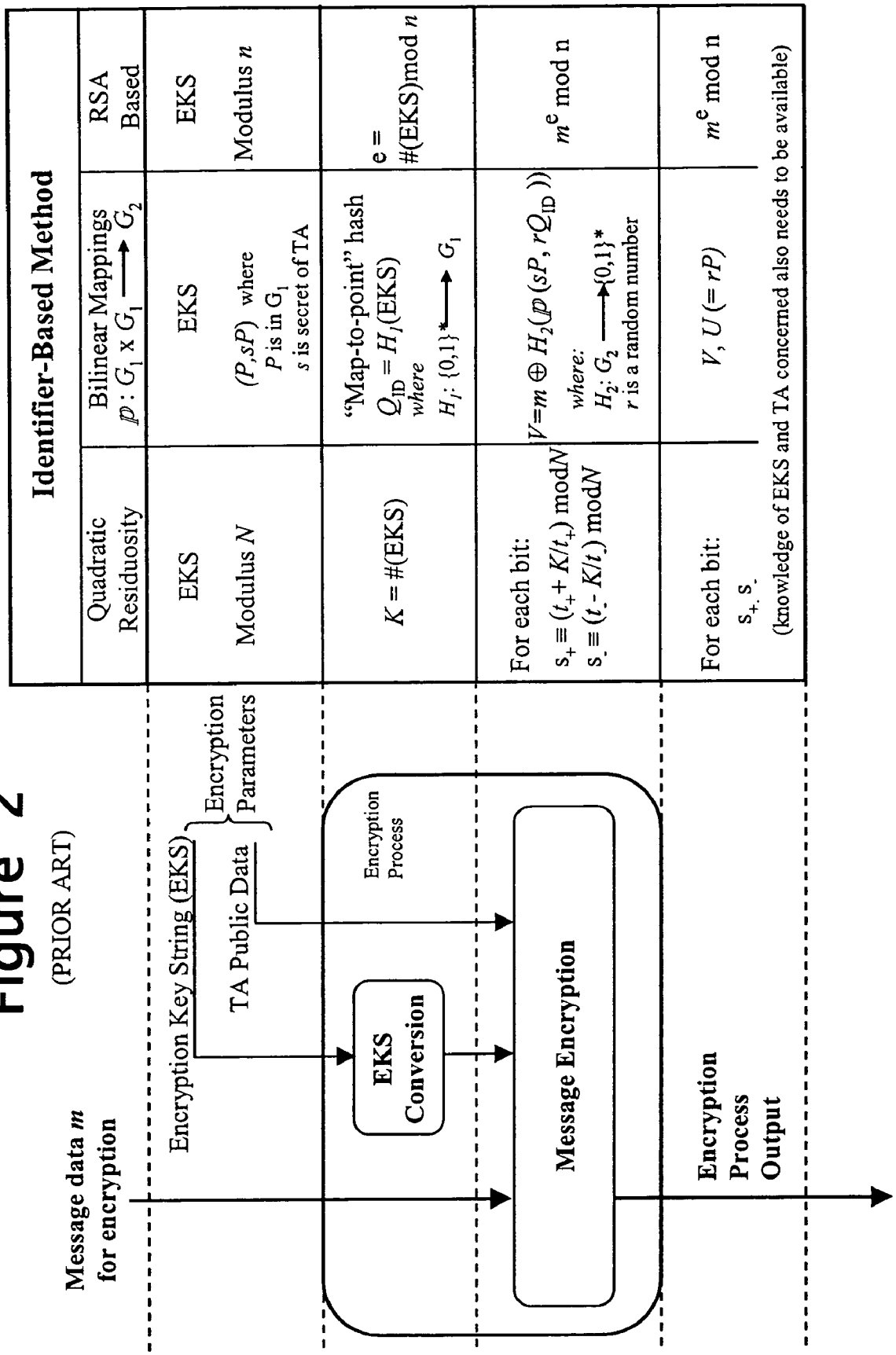
FIG. 2 is a diagram illustrating how certain IBE operations are implemented by three different prior art IBE methods.

Regarding the IBE method to which the public data 37 relates, in the following description of the FIG. 3 embodiment, it will be assumed, by way of example, that the IBE algorithm being used is the QR algorithm described above with respect to FIG. 1 with the user 39, service provider 38, and bank 35 respectively having the roles of the data provider 10, data recipient 11 and trusted authority 12. The public data 37 thus comprises the number N formed from the bank's private data p and q, and an indication of the hash algorithm # to be used.

The user 39 is provided with QR encryption software; this software is, for example, a software plug-in obtained from the bank's web site (not shown) and installed within the user's web browser (not shown). Preferably, the plug-in embeds knowledge regarding the bank's public data 37.

Similarly, the service provider 38 is provided with QR decryption software obtained from the bank 35 or from any other suitable source.

As regards the bank's public/private key pair (of which the public key is referenced 40), this could be a standard asymmetric key pair using a PKI infrastructure or another key pair such as one based on an IBE method.

The steps involved upon the user 39 placing an order with the service provider 38 will now be described.

Using the first computing entity 31 the user 39 downloads an order form 41 from the service provider 38 and completes the form for ordering specific goods and/or services (the completed form is referenced 42). The information used to complete the form may have different confidentiality categorisations, for example part of the order may be deemed non-confidential (such as goods and/or services required and associated quantities), while other parts of the order may be deemed to be confidential (such as the user's address required for delivery). Payment details for the order are not included on the order form but are included in a payment message 43 generated by the user 39 and intended for the attention of the user's bank 35; these payment details comprise, for example, the user's bank account number and the amount to be paid to the service provider 38.

Using the first computing entity 31 the user 39 now generates an IBE encryption key string (EKS) 44 to encrypt the completed order form 42 (or those portions of it categorised as confidential). The EKS 44 is generated (process 50) by encrypting the payment message 43 with the public key 40 associated with the bank 35, the resulting digital string of data bits being used to form, either alone or with other data, the EKS 44.

Once the encryption key string 44 has been derived, the completed form 42, or at least its confidential portions, are encrypted (process 51) using the described QR IBE encryption method; the encryption parameters used for this encryption are the EKS 44 and the public data N of the bank 35. The resultant form is herein called the encrypted form 45 regardless of whether it is all encrypted or is made up of a combination of plaintext and encrypted text.

The encrypted form 45, along with the encryption key string 44, is then sent to the service provider 38 by any suitable means, for example via e-mail or by being placed in a electronic public area.

In order for the service provider 38 to be able to decrypt the encrypted form 45, it must obtain a corresponding decryption key from the bank 35 acting in its role as the IBE trusted authority. To this end, the service provider 38 provides the EKS 44, as used by the user 39 to encrypt the completed order form, to the bank 45.

The bank uses the EKS 44, along with its private data, to generate the appropriate decryption key 47 (process 54). It may be noted that any change to the EKS by any party will result in a decryption key that will not decrypt the encrypted order form 45 correctly, thereby preventing the service provider 38 from understanding the order.

Additionally, the bank 35 uses its private key (corresponding to its public key 40) to decrypt the EKS 44 (process 53) thereby allowing the bank 35 to read the payment message created by the user 39.

In accordance with the user's instructions contained within the payment message the bank 35 initiates payment to the service provider 38 for payment of the goods and/or services ordered by the user 39. At the same time, the bank 35 provides the decryption key 47 to the service provider 38 which uses it, along with the public data N of the bank, to decrypt the encrypted order form 45 (process 46), or those portions that were encrypted, thereby recovering the completed order form 42 all in plaintext. The service provider 38 thereafter fulfils the order upon receipt of payment from the bank.

The foregoing arrangement ensures that the user's payment message is inaccessible to the service provider 38 whilst ensuring that the payment message is passed on to the bank unchanged—if this is not done, then the service provider 38 is unable to read the order it has received from the user 39.

It will be appreciated that many variants are possible to the above-described embodiment. For example, the encryption key string 44 could comprise, in addition to the encrypted payment message, dynamic information such as a time component (for example, the time of payment message encryption) and/or a random number. The encrypted message used to form the encryption key string is not restricted to being a payment message and could be any sort of message though preferably it is a message with interpretable meaning—that is, not just a random string of bits as might be the case if a cryptographic key was being sent by the user to the trusted authority. Thus, for example, the message can be any sort of instruction to be interpreted and executed by the trusted authority. Alternatively or additionally, the message can be one or more conditions required to be satisfied by the service provider before the decryption key is generated and/or provided to the latter. One such condition could relate to the service provider being able to establish its identity to the satisfaction of the bank 35; another possible condition could relate to the date on which payment is to be made.

Rather than the message 43 intended for the bank 35 being encrypted using the public key 40 of a public/private key pair associated with the bank, it would be possible, though not preferred, for this message to be encrypted using a symmetric key known only to the user 39 and bank 35.

Instead of the QR IBE method, the above-described embodiment can be implemented using any other suitable algorithm, such as those mentioned above that use of Weil or Tate pairings, or are RSA based.

The computing entities 31 to 33 are typically based around program-controlled processors though specialized hardware can be provided for implementing at least some of the cryptographic functions described above.

The user 39 could provide the EKS 44 directly to the bank 35 as an alternative to, or in addition to, providing the EKS 44 to the service provider 38; in this case, additional information will typically also be provided to enable the service provider and bank to associate the EKS provided to the bank with the order provided to the service provider.

The invention claimed is:

1. A method of securely transferring first and second data from a user to first and second parties respectively, wherein:
   the user encrypts the first data using a first encryption key associated with the first party, and then encrypts the second data using, as encryption parameters, both public data of said first party and third data comprising the encrypted first data;
   the third data is provided to the first party and the encrypted second data is provided to the second party;
   the first party uses a first decryption key to decrypt the encrypted first data, as provided to the first party in said third data, whereby to recover the first data;
   the first party also using the third data, along with private data related to said public data, to generate a second decryption key;
   the second decryption key is provided to the second party which uses it to decrypt the encrypted second data.

2. A method according to claim 1, wherein the first encryption key corresponds to a public key associated with the first party and for which that party has a corresponding private key that constitutes said first decryption key.

3. A method according to claim 1, wherein the first encryption key and the first decryption key are the same.

4. A method according to claim 1, wherein the first data comprises a message with interpretable content.

5. A method according to claim 4, wherein said message comprises an instruction to the first party to carry out a specific action, the first party interpreting the recovered first data and carrying out said specific action.

6. A method according to claim 4, wherein said message comprises a condition to be satisfied before the second decryption key is provided to the second party, the first party interpreting the recovered first data and ensuring that said condition is satisfied before it generates said second decryption key and/or provides that key to the second party.

7. A method according to claim 4, wherein the third data further comprises at least one of a random number and a time indication.

8. A method according to claim 4, wherein the user sends the encrypted second data, together with the third data, to the second party; the second party providing the third data to the first party.

9. A computer system comprising first, second and third computing entities, wherein:
    the first computing entity comprises a first arrangement for encrypting a first data set using a first encryption key associated with a third party;
    a second arrangement for encrypting a second data set using, as encryption parameters, both public data of said third party and a third data set comprising the encrypted first data set;
    and a third arrangement for outputting the encrypted second data set for provision to the second computing entity and for outputting the third data set for provision to the third computing entity;
    and the third computing entity is associated with said third party and is arranged to use a first decryption key to decrypt the encrypted first data as provided to the third computing entity in said third data set whereby to recover the first data set;
    the third computing entity being further arranged to generate, using the third data set and private data related to said public data, a second decryption key for enabling the second computing entity to decrypt the encrypted second data set.

10. A computer system according to claim 9, wherein the first encryption key corresponds to a public key associated with the third party and for which that party has a corresponding private key that constitutes said first decryption key.

11. A computer system according to claim 9, wherein the first encryption key and the first decryption key are the same.

12. A computer system according to claim 9, wherein the first data set comprises a message with interpretable content, the third computing entity being arranged to interpret the content of the recovered first data set.

13. A computer system according to claim 12, wherein said message comprises an instruction to the third computing entity to carry out a specific action, the third computing entity being arranged to interpret the recovered first data set and carry out said specific action.

14. A computer system according to claim 12, wherein said message comprises a condition to be satisfied before the said decryption key is provided to the second computing entity, the third computing entity being arranged to interpret the recovered first data set and ensure that said condition is satisfied before it generates said decryption key and/or provides that key to the second computing entity.

15. A computer system according to claim 12, wherein the third data set further comprises at least one of a random number and a time indication.

16. A computer system according to claim 12, wherein the said third arrangement of the first computing entity is arranged to send the encrypted second data set, together with the third data set, to the second computing entity; the second computing entity being arranged to provide the third data set to the third computing entity.

17. Apparatus comprising:
    first means for forming a first data set comprising a message intended for a trusted authority;
    second means for encrypting the first data set using an encryption key associated with the trusted authority;
    third means for encrypting a second data set using, as encryption parameters, both public data of the trusted authority and a third data set comprising the encrypted first data set;
    fourth means for outputting the encrypted second data set for provision to another party and for outputting the third data set for provision to the trusted authority.

18. Apparatus according to claim 17, wherein said message comprises an instruction to the trusted authority to carry out a specific action.

19. Apparatus according to claim 17, wherein said message comprises a condition to be checked by the trusted authority as being satisfied before the trusted authority provides a decryption key to the said another party for use in decrypting the encrypted second data set.

20. Apparatus according to claim 17, wherein the third data set further comprises at least one of a random number and a time indication.

21. Apparatus according to claim 17, wherein the fourth means is arranged to send the third data set, together with the encrypted second data set, to said another party for the latter to provide the third data set to the trusted authority.

22. A computer program product comprising a computer readable storage medium containing instructions arranged to cause a computing apparatus, when installed thereon, to provide:
    first means for forming a first data set comprising a message intended for a trusted authority;
    second means for encrypting the first data set using an encryption key associated with the trusted authority;
    third means for encrypting a second data set using, as encryption parameters, both public data of the trusted authority and a third data set comprising the encrypted first data set; and
    fourth means for outputting the encrypted second data set for provision to another party and for outputting the third data set for provision to the trusted authority.

* * * * *